United States Patent [19]

Akutagawa et al.

[11] Patent Number: 5,084,525

[45] Date of Patent: Jan. 28, 1992

[54] EPOXY RESIN COMPOSITION WITH POLYAMIDE POWDER

[75] Inventors: Ichiro Akutagawa, Nagareyama; Tutomu Yamaguchi, Saitama; Kunimitsu Matsuzaki, Yono, all of Japan

[73] Assignee: Somar Corporation, Japan

[21] Appl. No.: 473,477

[22] Filed: Feb. 1, 1990

[30] Foreign Application Priority Data

Apr. 28, 1989 [JP] Japan .................. 1-110365

[51] Int. Cl.$^5$ ............................. C08L 63/02
[52] U.S. Cl. .................. 525/423; 523/428; 523/429
[58] Field of Search .............. 525/423, 420.5; 523/428, 429

[56] References Cited

U.S. PATENT DOCUMENTS 4,332,713 6/1982 Lehmann ............................. 525/423

FOREIGN PATENT DOCUMENTS 57-102920 6/1982 Japan .................. 525/423
59-4619 1/1984 Japan .................. 525/423

Primary Examiner—Melvyn I. Marquis
Assistant Examiner—Robert E. L. Sellers, II.
Attorney, Agent, or Firm—Lorusso & Loud

[57] ABSTRACT

An epoxy resin bonding composition containing two different epoxy resin as a liquid admixture, a curing agent and a polyamide powder is disclosed. The bonding composition may be used, for example, to bond a ferrite magnetic to a motor yoke. One of the epoxy resins is an unmodified glycidyl ether of bisphenol A, bisphenol F or bisphenol AD. The other epoxy resin is an urethane-modified or glycol-modified glycidyl ether of bisphenol A, bisphenol F or bisphenol AD. The polyamide powder has an average particle size of 150 μm or less and a melting of at least 170° C. and is present in an amount 1–50 parts by weight per 100 parts by weight of liquid epoxy resin admixture.

5 Claims, No Drawings

EPOXY RESIN COMPOSITION WITH POLYAMIDE POWDER

BACKGROUND OF THE INVENTION

This invention relates generally to an epoxy resin composition and, more specifically, to an epoxy resin composition capable of being cured with a minimized curing stress. The present invention is also concerned with a method of bonding articles such as a ferrite magnet and a motor yoke using the above epoxy resin composition.

One pack-type liquid epoxy resin containing a liquid epoxy resin blended with a latent curing agent is known and is used in various fields. In recent years, it has been proposed to use an adhesive for fixing a ferrite magnet to a motor yoke in lieu of fixation by bolting. For this purpose, the use of such a one pack-type liquid epoxy resin containing a liquid epoxy resin and dicyandiamide as mentioned above has been proposed. The known epoxy resin composition, however, has a problem that a curing stress is generated considerably when the amount of the curing agent and the curing accelerator is increased to such a degree that the composition can be cured at a temperature of 150° C. within 10 minutes. The curing stress causes formation of cracks in the cured body and separation of the cured body from the surface to which the cured body has been bonded.

SUMMARY OF THE INVENTION

It is, therefore, an object of the present invention to provide an epoxy resin composition which can be cured with a minimized curing stress.

It is a special object of the present invention to provide a composition of the above-mentioned type which is suited for bonding articles.

It is a further object of the present invention to provide a method for bonding articles with the above epoxy resin composition.

In accomplishing the foregoing objects, there is provided in accordance with the present invention an epoxy resin composition comprising:

a liquid epoxy resin;

a curing agent capable of reacting with said epoxy resin when heated to a curing temperature; and a polyamide powder having an average particle size of 150 μm or less and a melting point of at least 170° C. and used in an amount of 1–50 parts by weight per 100 parts by weight of said epoxy resin.

In another aspect, the present invention provides a method of fixing a ferrite magnet to a desired location of a surface of a motor yoke, comprising the steps of:

providing the above epoxy resin composition;

magnetically bonding the ferrite magnet to the motor yoke at the desired location, at least one of the magnet and the yoke is so shaped that an interstice of 0.02–1 mm is defined therebetween;

positioning the resulting assembly to maintain the interstice in a vertical or slanted position;

applying a quantity of the epoxy resin composition on an upper portion of the interstice; and heating the assembly at the curing temperature which is lower than 170° C., so that the epoxy resin composition penetrates into the interstice and is cured within the interstice to form permanent bonding between the ferrite magnet and the yoke.

The present invention also provides a method of bonding first and second articles to each other, comprising the steps of:

providing an epoxy resin composition according to claim 1;

applying said epoxy resin composition to a surface of at least one of said first and second articles to form a layer of said epoxy resin composition thereon;

contacting said first and second articles with each other with said layer being interposed therebetween; and heating said layer at the curing temperature which is lower than 170° C. to harden said layer.

Other objects, features and advantages of the present invention will become apparent from the detailed description of the invention to follow.

DETAILED DESCRIPTION OF THE INVENTION

In the present invention, any epoxy resin may be used as long as it is liquid at normal temperature. An epoxy resin which is solid at normal temperature may also be used by dissolving it in a liquid epoxy resin.

It is preferred that the following two types of epoxy resins be used in combination for reasons of bending strength and expansibility and of suppressing the generation of curing stresses. One of them is a diglycidyl ether of a bisphenol having an epoxy equivalent of 158–270, preferably 175–270. By the term "epoxy equivalent" is meant "weight per epoxy" which is a weight (g) of the epoxy resin providing 1 g equivalent, of the epoxy group. Illustrative of suitable diglycidyl ethers of bisphenols are bisphenol A, bisphenol F and bisphenol AD epoxy resins. These diglycidyl ethers may be used by themselves or as a mixture of two or more thereof.

The other type of the epoxy resin which is to be used in combination with the above diglycidyl ether of a bisphenol is a flexible resin, preferably one obtained by modifying the above diglycidyl ethers with a glycol or an urethane. Examples of the glycol-modified, diglycidyl ether resins include the compounds having the following general formula:

$$CH_2\!-\!\!-\!\!CH\!-\!CH_2\!-\!O\!-\!R\!-\!O\!-\!Ph\!-\!C(CH_3)_2\!-\!Ph\!-\!O\!-\!R\!-\!O\!-\!CH_2\!-\!CH\!-\!\!-\!\!CH_2$$
$$\diagdown\!O\!\diagup \qquad\qquad\qquad\qquad\qquad\qquad\qquad\qquad\qquad \diagdown\!O\!\diagup$$

wherein R stands for $-CH_2CH_2\!-\!\!(\!OCH_2CH_2\!)_n\!-$, $-CH_2CH_2CH_2\!-\!\!(\!OCH_2CH_2CH_2\!)_n\!-$ or $-CH_2CH_2CH_2CH_2\!-\!\!(\!OCH_2CH_2CH_2CH_2\!)_n\!-$ where n is a positive integer, and Ph stands for p-phenylene.

Examples of the urethane-modified, diglycidyl ether resins include the compounds of the following general formulas:

$$CH_2\!-\!\!-\!\!CH\!-\!CH_2\!-\!O\!-\!(\!R\!-\!O\!-\!CO\!-\!NHR'\!-\!NH\!-\!CO\!-\!O\!-\!)_n R\!-\!O\!-\!CH_2\!-\!CH\!-\!\!-\!\!CH_2$$
$$\diagdown\!O\!\diagup \qquad\qquad\qquad\qquad\qquad\qquad\qquad\qquad\qquad \diagdown\!O\!\diagup$$

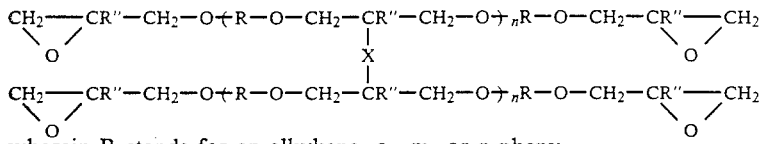

wherein R stands for an alkykene, o-, m- or p-phenylene, o-, m- or p-phthaloyl, —Ph—CH₂—Ph—, —Ph—C(CH₃)₂—Ph—, —Ph—CHCH₃—Ph— or $\pmb{\{}CH_2CH_2O\pmb{\}_m}$ where Ph is p-phenylene and m is a positive integer, R' stands for p-phenylene, alkylene or $\pmb{\{}Ph—CH_2—Ph\pmb{\}_m}$ where Ph and m are as defined above, R" stands for hydrogen or methyl, X stands for —O—CO—NH—R'—NH—CO—O— and n is a positive integer.

The diglycidyl ether of a bisphenol is preferably used in an amount of 95–50% by weight, while the flexible epoxy resin is used in an amount of 5–50% by weight.

The curing agent to be used in the present invention is preferably a latent curing agent which does not react with the mixed epoxy resin at room temperature but can react therewith at a temperature of 60° C. or more, preferably 100° C. or more. As such a curing agent, there may be preferably used a nitrogen-containing, latent curing agent, such as dicyandiamide, a guanamine, e.g. acetoguanamine and benzoguanamine, a hydrazide, e.g. adipodihydrazide, stearodihydrazide, isophthalodihydrazide and sebacohydrazide, or a triazine compound, e.g. 2,4-dihydrazide-6-methylamino-S-triazine. The latent curing agent is preferably used in an amount of 10–100 parts by weight per 100 parts by weight of the epoxy resin.

It is preferred that a curing accelerator be used in conjunction with the above curing agent. Such a promoter may be, for example, a urea derivative such as 3-(3,4-dichlorophenyl)-1,1-dimethylurea, toluidine diisocyanate or isophoronediisocyanate, an imidazole derivative, a solid solution containing 1,8-diaza-bicyclo(5,4,0)undecene-7 and a phenol novolak. The use of the curing accelerator is not always necessary, depending upon the kind and amount of the curing agent. The curing accelerator is generally suitably used in an amount of 1–30 parts per 100 parts of the mixed epoxy resin.

In the present invention, the latent curing agent and the curing accelerator are used in a relatively large amount and, generally, in an amount of 10 parts by weight or more, preferably 15 parts by weight or more per 100 parts by weight of the epoxy resin.

Polyamide powder is incorporated into the composition according to the present invention as a curing stress suppressing agent. As the polyamide powder, Nylon powder having a melting point of at least 170° C. is used. For example, Nylon 12 (Dyamide P-1, manufactured by Dicel Inc., melting point: 180° C.), Nylon 11 (Rylson Fine Powder, manufactured by Nihon Rylson Inc., melting point: 186° C.) may be suitably used. The polyamide powder has an average particle diameter of 150 μm or less, generally 100–20 μm. The amount of the polyamide powder is 1–50 parts by weight, preferably 2–30 parts by weight per 100 parts by weight of the epoxy resin.

If necessary, an inorganic filler may be incorporated into the composition of the present invention. Illustrative of the inorganic fillers are silica, alumina, titania, calcium carbonate, talc, clay, calcium silicate, mica, glass fibers, glass powder, glass flakes and whiskers of various kinds. The amount of the inorganic filler is 1–400 parts by weight, preferably 10–300 parts by weight per 100 parts by weight of the epoxy resin.

In the present invention a thixotropic agent is preferably used. Examples of such a thixotropic agent include super-fine silica and alumina having an average particle size of 1 μm or less, aluminum hydroxide having an average particle size of 10 μm or less, fibrous magnesium oxysulfate, fibrous silica, fibrous potassium titanate, scale-like mica, and a montmorillonite-organic salt composite, so called bentonite. The thixotropic agent is used in an amount of 0.1–30 parts by weight, preferably 0.5–15 parts by weight per 100 parts by weight of the epoxy resin.

An organic solvent may be further incorporated into the composition of the present invention, if necessary. As the organic solvent, those of a type which is relatively volatile and has a boiling point of 40°–220° C., preferably 80°–180° C. are used. Examples of such organic solvents include dimethylformamide, isopropyl alcohol, methyl isobutyl ketone, ethylene glycol monoethyl ether, ethylene glycol dialkyl ether and methylcellosolve. The organic solvent serves to lower the viscosity of the composition and to enhance the penetrability thereof. During heat-curing stage, the solvent is vaporized and removed from the composition. Thus, the cured mass is substantially free of the organic solvent and, therefore, the physical properties thereof are not adversely affected by the solvent.

The organic solvent is used in an amount of 2–50 parts by weight, preferably 5–30 parts by weight per 100 parts by weight of the mixed epoxy resin. In this connection, it is preferred that the organic solvent be used in an amount so that the composition has a viscosity (25° C.) of 50–10,000 c.p., preferably 500–5,000 c.p.

The composition according to the present invention may further contain, as desired, a reactive diluent. Examples of the reactive diluent include a polyoxyalkylene glycol glycidyl ether, phenoxyether monoepoxide, 1,6-hexane diol diglycidyl ether, phenyl glycidyl ether and 2-ethylhexyl glycidyl ether. The amount of the reactive diluent is suitably 0–30 parts by weight per 100 parts by weight of the epoxy resin.

The composition according to the present invention may further contain, as desired, a flame retarder, a coupling, a leveling agent, a lubricating agent, an ooze-preventing agent, a sedimentation-preventing agent, a dispersing agent, an adhesion-imparting agent, a wetting agent or a pigment.

The epoxy resin composition of the present invention gives a cured body in which the occurrence of curing stresses is suppressed. In this case, the curing is performed at such a temperature that the polyamide powder does not substantially melt. When such a temperature as to cause the melting of the polyamide powder is used, the molten powder is dissolved in the epoxy resin so that the curing stress-absorbing effect by the polyamide powder is no longer feasible and, therefore, it is not possible to attain the desired objects. As the curing conditions, a temperature of 80°-200° C. is generally adopted.

While the epoxy resin composition according to the present invention can be utilizable as a molding or cast molding resin, it is especially advantageously used as an adhesive. When the epoxy resin composition of the present invention is used as an adhesive, two articles are previously adhered to each other with this composition and then heated in a heating furnace at a temperature sufficient to cure the composition but insufficient to melt the Nylon powder. The curing time depends upon the heating temperature and is generally within 10 minutes at a temperature of 150° C.

The epoxy resin composition of the present invention is suitably used as an adhesive for bonding articles which are fragile and require resistance to heat and heat shocks, such as for bonding of a metal, e.g. a yoke of a motor, to a ferrite, bonding of a ceramic to a metal, glass or a substrate, bonding of ferrites to each other or bonding of ceramics to each other.

As a method for bonding using the composition of the present invention, there may be adopted a method in which articles to be bonded which have been applied with the composition by brush coating, dispenser or screen printing are pressure bonded to each other with heating for curing.

In bonding a ferrite magnet to a motor yoke with the composition of the present invention, the ferrite magnet is first attached to a desired position of the motor yoke by utilizing its magnetic force so that an interstice of 0.02-1 mm is defined therebetween. Then, a predetermined quantity of the composition is applied by, for example, dropping from a dispenser, onto an upper portion of the interstice between the motor yoke and the ferrite magnet. All what is subsequently needed is to place the resulting assembly in an oven. Because of excellent penetrability of the composition of the present invention, it swiftly flows down into the interstice between the motor yoke and the ferrite magnet. The composition is then cured with the simultaneous vaporization of the organic solvent. The heating temperature in the oven is generally 100°-220° C., preferably 150°-180° C. and the heating time is 5-120 minutes, preferably 15-60 minutes. In this manner, the ferrite magnet can be tightly bonded to the motor yoke by a simple operation.

In the cured body obtained from the epoxy resin composition according to the present invention, the generation of curing stresses is suppressed and the occurrence of cracks is not seen. Further, the cured body is excellent in bonding force and strength.

The present invention will be further explained in detail below by way of examples, in which "part" is by weight.

EXAMPLE 1

Homogeneous mixtures having the compositions shown in Table 1 were prepared and evaluated for their performance in the following manner. The results are shown in Table 1.

(1) Gel time at 150° C.

In accordance with JIS C 2105, 0.4 cc of a sample composition is placed on a hot plate at 150° C. and a period of time required for the composition to form a gel is measured.

(2) Thermocurability

In accordance with JIS K 6850, a composition is coated over an end portion (width: 10 mm) of a soft steel plate (longitudinal length: 100 mm, lateral length: 25 mm, thickness: 1.6 mm) to which another steel plate of the same size is connected (overlap area: 10 mm × 25 mm). This is then subjected to heat curing treatment at 150° C. for 10 minutes under pressure. After bonding the plates are pulled toward opposite directions to measure the tensile strength. Evaluation is made as follows:
o: greater than 150 kg/cm$^2$
x: lower than 150 kg/cm$^2$ (3) Heat cycle property A composition is applied onto a ferrite magnet having a longitudinal length of 50 mm, a lateral length of 50 mm and a thickness of 5 mm, on which a soft steel plate having a longitudinal length of 100 mm and a lateral length of 100 mm and a height of 3 mm is superimposed under pressure. This is then placed into a heating furnace and heated at 150° C. for 10 minutes. The bonded body is then allowed to stand at −60° C. for 1 hour and, subsequently, at 150° C. for 1 hour. Such a cooling-heating cycle is repeated 250 times.
o: No cracks are formed and no separation of the ferrite occurs
x Cracks are formed in the ferrite and the resin, or ferrite is separated from the bonded surface The ingredients shown in Table 1 are as follows:
Epikote 828: Bisphenol A-type epoxy resin, epoxy equivalent: 190, liquid at ambient temperature, manufactured by Yuka-Shell Epoxy Inc.
EPU-6: Urethane-modified epoxy resin, liquid at normal temperature
Reactive diluent: 1,6-hexane diol diglycidyl ether
DCMU: curing accelerator having the formula:

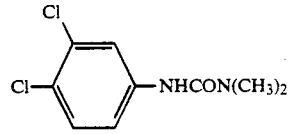

ADH: Adipodihydrazide
Nylon powder: Nylon 11, melting point: 186° C., average particle size: 50 μm, manufactured by Rylson Inc.
Colloidal silica: average particle size: 0.01 μm
White pigment: Titanium oxide The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

TABLE 1

| Experiment No. | 1 | 2 | 3 | 4 | 5 | 6 | 7 | 8 | 9* | 10* | 11* |
|---|---|---|---|---|---|---|---|---|---|---|---|
| Epikote 828 | 100 | 100 | 90 | 70 | 70 | 65 | 100 | 100 | 70 | 70 | 70 |
| EPU-6 | — | — | — | 30 | 30 | 30 | — | — | 30 | 30 | 30 |
| Reactive Diluent | — | — | 10 | — | — | 5 | — | — | — | — | — |
| Dicyanodiamide | 8 | 14 | 8 | 8 | 12 | 12 | 8 | 3 | 4 | 8 | 3 |
| DCMU | 6 | 10 | 6 | 8 | 10 | 10 | 8 | — | 2 | 6 | — |

TABLE 1-continued

| Experiment No. | 1 | 2 | 3 | 4 | 5 | 6 | 7 | 8 | 9* | 10* | 11* |
|---|---|---|---|---|---|---|---|---|---|---|---|
| ADH | — | — | — | — | — | — | — | 23 | — | — | 23 |
| Nylon powder | 10 | 10 | 10 | 5 | 5 | 5 | 20 | 10 | — | — | — |
| Colloidal silica | — | — | — | — | — | 8 | — | — | — | — | — |
| White pigment | 25 | 25 | 25 | 25 | 10 | 10 | 25 | 25 | 25 | 25 | 25 |
| 150° C. gel time (sec) | 165 | 90 | 175 | 135 | 120 | 125 | 140 | 124 | 220 | 155 | 122 |
| Thermocurability | ○ | ○ | ○ | ○ | ○ | ○ | ○ | ○ | x | ○ | ○ |
| Heat cycle property | ○ | ○ | ○ | ○ | ○ | ○ | ○ | ○ | ○ | x | x |

*Comparative Example

What is claimed is:

1. An epoxy resin composition comprising:
    a liquid epoxy resin mixture composed of 50-95 parts by weight of an diglycidyl ether of bisphenol A, bisphenol F or bisphenol AD and 5-50 parts by weight of an urethane-modified or glycol-modified diglycidyl ether of bisphenol A, bisphenol F or bisphenol AD as a flexible epoxy resin;
    a curing agent capable of reacting with said epoxy resin mixture when heated to a curing temperature; and
    a polyamide powder having an average particle size of 150 μm or less and a melting point of at least 170° C. and present in an amount of 1-50 parts by weight per 100 parts by weight of said epoxy resin mixture.

2. A composition as claimed in claim 1, further comprising an inorganic filler.

3. A composition as claimed in claim 1, further comprising a curing promoter.

4. A composition as claimed in claim 3, wherein the total amount of said curing agent and said curing promoter is at least 10 parts by weight per 100 parts by weight of said epoxy resin.

5. An epoxy resin composition in accordance with claim 1, wherein said flexible epoxy resin is a urethane-modified glycidyl ether of bisphenol A, bisphenol F or bisphenol AD.

* * * * *

UNITED STATES PATENT AND TRADEMARK OFFICE
CERTIFICATE OF CORRECTION

PATENT NO. : 5,084,525
DATED : January 28, 1992
INVENTOR(S) : AKUTAGAWA et al It is certified that error appears in the above-identified patent and that said Letters Patent is hereby corrected as shown below:

IN THE ABSTRACT:

Line 2, "resin" should read --resins--;

Line 5, "magnetic" should read --magnet--; and

Line 11, after "melting" insert --point--.

Signed and Sealed this

Twenty-second Day of June, 1993

Attest:

MICHAEL K. KIRK

*Attesting Officer*     Acting Commissioner of Patents and Trademarks